US006810520B2

(12) United States Patent
Lu et al.

(10) Patent No.: US 6,810,520 B2
(45) Date of Patent: Oct. 26, 2004

(54) PROGRAMMABLE MULTI-STANDARD MAC ARCHITECTURE

(75) Inventors: Xiaolin Lu, Plano, TX (US); Donald P. Shaver, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 292 days.

(21) Appl. No.: 09/737,714

(22) Filed: Dec. 15, 2000

(65) Prior Publication Data

US 2002/0078249 A1 Jun. 20, 2002

Related U.S. Application Data

(60) Provisional application No. 60/172,516, filed on Dec. 17, 1999, and provisional application No. 60/172,541, filed on Dec. 17, 1999.

(51) Int. Cl.[7] ............................................. G60F 15/16
(52) U.S. Cl. ......................................... 719/310; 710/52
(58) Field of Search ........................... 719/310; 709/250

(56) References Cited

U.S. PATENT DOCUMENTS 6,108,713 A * 8/2000 Sambamurthy et al. ..... 709/250
6,167,032 A * 12/2000 Allison et al. ............... 370/252
6,373,848 B1 * 4/2002 Allison et al. ............... 370/401

OTHER PUBLICATIONS

World Moves, San Francisco–Feb. 1, 1997.*

* cited by examiner

*Primary Examiner*—Meng-Al T. An
*Assistant Examiner*—LeChi Truong
(74) *Attorney, Agent, or Firm*—Robert D. Marshall, Jr.; W. James Brady, III; Frederick J. Telecky, Jr.

(57) ABSTRACT

The present invention provides a method, system and apparatus for managing data flow over an open system interconnection type network (10) which includes a physical layer (12) and a media access control layer (146). The invention implements a plurality of operating modules (315) each enabling a respective media access control layer operating function in which at least a portion of the operating modules are implemented in software. The invention further implements a host interface module (305) for communication between a host processor and the media access control layer, a physical layer interface module (310) for communication between the physical layer and media access control layer, and an inter-module programming interface for communications between respective operating modules.

26 Claims, 13 Drawing Sheets

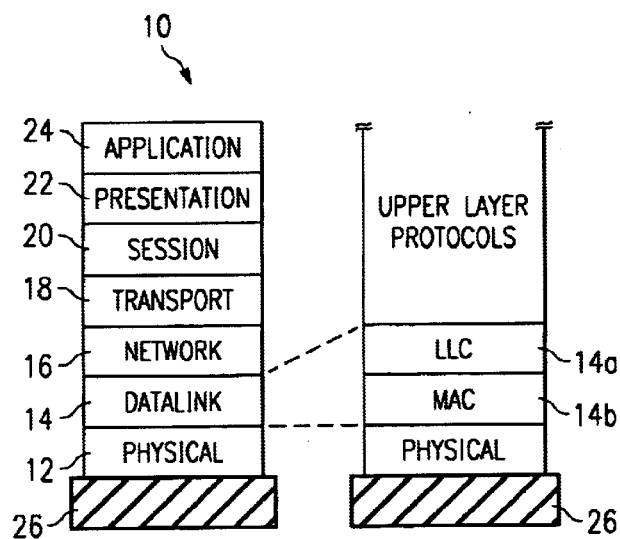
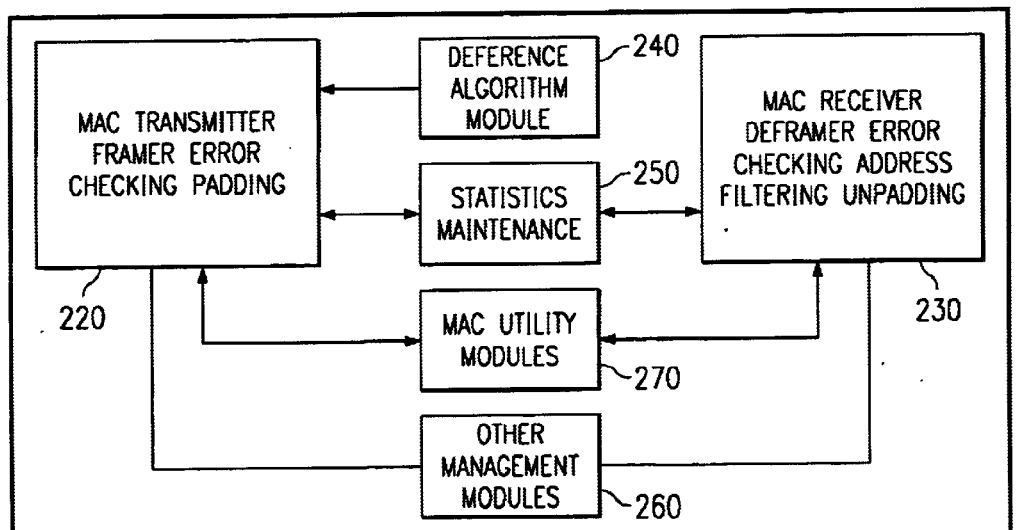

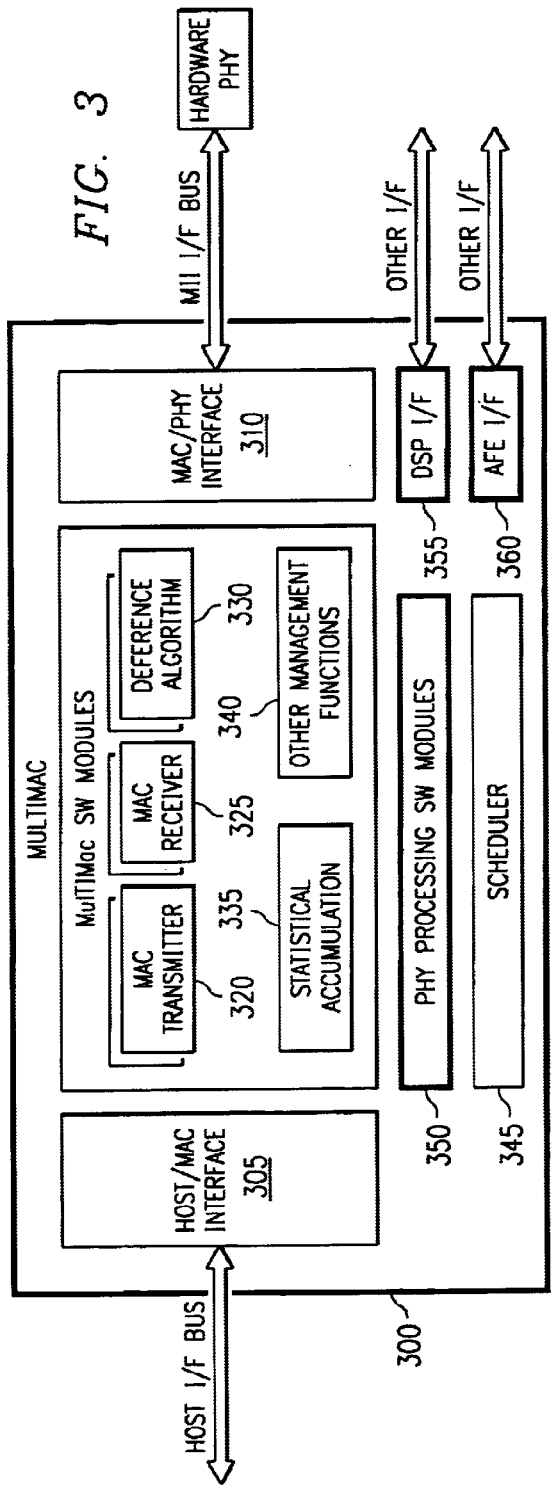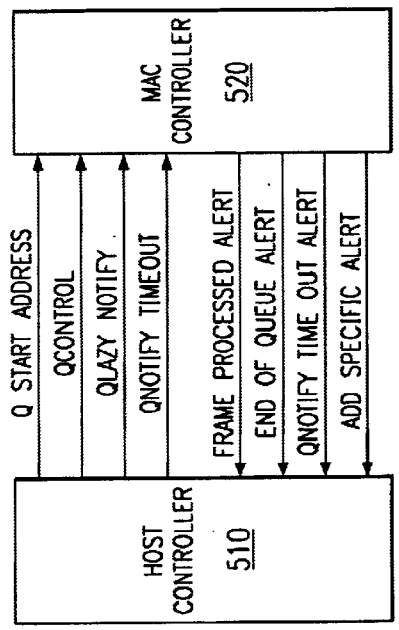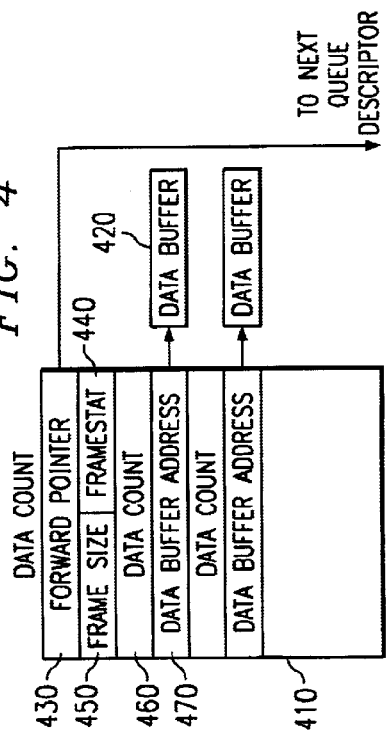

FIG. 12

| REGISTER ADDRESS | REGISTER NAME | DESCRIPTION | R/W | IMPLEMENTATION |
|---|---|---|---|---|
| 0 | Tx ADDRESS REGISTER | TxFRAME START ADDRESS | MAC WRITE | MAC |
| 1 | Tx LENGTH REGISTER | TxFRAME LENGTH | MAC WRITE | PHY |
| 2 | Rx ADDRESS REGISTER | RxFRAME START ADDRESS | MAC WRITE | MAC |
| 3 | Rx LENGTH REGISTER | RxFRAME LENGTH | MAC READ | PHY |
| 4 | CONTROL REGISTER | FRAME TRANSMIT AND RECEIVE CONTROL REGISTER | MAC WRITE | MAC |
| 5 | STATUS REGISTER | PHY SIGNALING STATUS | MAC READ | MAC |
| 6 | INTERRUPT MASK REGISTER | PHY TO MAC INTERRUPT MASKS | MAC WRITE | MAC |
| 7 | INTERRUPT STATUS REGISTER | INTERRUPT STATUS | MAC READ | MAC |
| 8 | CRC32 HIGH REGISTER | CRC32 HIGH 16 BITS | MAC READ | PHY |
| 9 | CRC32 LOW REGISTER | CRC32 LOW 16 BITS | MAC READ | PHY |
| 10 | CRC16 REGISTER | CRC16 | MAC READ | PHY |
| 11 | PHY MANAGEMENT CONTROL REGISTER | DESCRIBED IN 5 | HOST/MAC WRITE | PHY |
| 12 | PHY MANAGEMENT STATUS REGISTER | DESCRIBED IN 5 | HOST/MAC READ | PHY |

FIG. 13

| BITS | NAME | DESCRIPTION | R/W |
|---|---|---|---|
| 15 | TxON | 1=SET TxON SIGNAL<br>0=CLEAR TxON SIGNAL | R/W |
| 14 | BkON | 1=SET BkON SIGNAL<br>0=CLEAR BkON SIGNAL | R/W |
| 13 | TxV1M1 | 1=SET TxV1M1 SIGNAL<br>0=CLEAR TxV1M1 SIGNAL | R/W |
| 12~8 | RESERVED | WRITE AS 0, IGNORE ON READ | R/W |
| 7 | INTERRUPT ENABLE | 1=PHY INTERRUPTS ARE GLOBALLY ENABLED<br>0=PHY INTERRUPTS ARE GLOBALLY ENABLED | R/W |
| 6~0 | RESERVED | WRITE AS 0, IGNORE ON READ | R/W |

FIG. 14

| BITS | NAME | DESCRIPTION | R/W |
|---|---|---|---|
| 15 | TxON | 1=TxON SIGNAL IS ASSERTED<br>0=TxON SIGNAL IS NOT ASSERTED | R |
| 14 | BkON | 1=BkON SIGNAL IS ASSERTED<br>0=BkON SIGNAL IS NOT ASSERTED | R |
| 13 | TxV1M1 | 1=TxV1M1 SIGNAL IS ASSERTED<br>0=TxV1M1 SIGNAL IS NOT ASSERTED | R |
| 12 | RxON | 1=RxON SIGNAL IS ASSERTED<br>0=RxON SIGNAL IS NOT ASSERTED | R |
| 11 | CS | 1=CS SIGNAL IS ASSERTED<br>0=CS SIGNAL IS NOT ASSERTED | R |
| 10 | CD | 1=CD SIGNAL IS ASSERTED<br>0=CD SIGNAL IS NOT ASSERTED | R |
| 9 | RxV1M1 | 1=RxV1M1 SIGNAL IS ASSERTED<br>0=RxV1M1 SIGNAL IS NOT ASSERTED | R |
| 8 | RxErr | 1=RxErr SIGNAL IS ASSERTED<br>0=RxErr SIGNAL IS NOT ASSERTED | R |
| 7 | INTERRUPT ENABLE | 1=PHY INTERRUPTS ARE GLOBALLY ENABLED<br>0=PHY INTERRUPTS ARE GLOBALLY DISABLED | R |
| 6~0 | RESERVED | IGNORE ON READ | R |

FIG. 15

| BITS | NAME | DESCRIPTION | R/W |
|---|---|---|---|
| 15 | CS_ON ENABLE | 1=ENABLE INTERRUPT WHEN CS SIGNAL BECOMES ASSERTED<br>0=DISABLE CS_ON INTERRUPT | R/W |
| 14 | CS_OFF ENABLE | 1=ENABLE INTERRUPT WHEN CS SIGNAL BECOMES DE-ASSERTED<br>0=DISABLE CS_OFF INTERRUPT | R/W |
| 13 | CD_ON ENABLE | 1=ENABLE INTERRUPT WHEN CD SIGNAL BECOMES ASSERTED<br>0=DISABLE CD_ON INTERRUPT | R/W |
| 12 | RxON_ON ENABLE | 1=ENABLE INTERRUPT WHEN RxON SIGNAL BECOMES ASSERTED<br>0=DISABLE RxON_ON INTERRUPT | R/W |
| 11 | RxON_BkON ENABLE | 1=ENABLE INTERRUPT WHEN RxON SIGNAL BECOMES ASSERTED DURING THE BACKOFF SLOTS<br>0=DISABLE RxON_BkON INTERRUPT | |
| 10 | RxErr_ON ENABLE | 1=ENABLE INTERRUPT WHEN RxErr SIGNAL BECOMES ASSERTED<br>0=DISABLE RxErr_ON SIGNAL | R/W |
| 9 | PHY RxFifo OVERRUN ENABLE | 1=ENABLE INTERRUPT WHEN PHY's RECEIVE FIFO OVERRUN<br>0=DISABLE THE INTERRUPT | R/W |
| 8 | PHY TxFifo UNDERRUN ENABLE | 1=ENABLE INTERRUPT WHEN PHY's TRANSMIT FIFO IS UNDERRUN<br>0=DISABLE THE INTERRUPT | R/W |
| 7 | PHY SAMPLE DATA READY ENABLE | 1=ENABLE INTERRUPT WHEN PHY's SAMPLE DATA IS READY FOR DSP PROCESSING<br>0=DISABLE THE INTERRUPT | R/W |
| 6 | PHY LOG DATA READY | 1=ENABLE INTERRUPT WHEN PHY's LOG DATA IS READY FOR DSP/HOST TO SAMPLE<br>0=DISABLE THE INTERRUPT | R/W |
| 5~0 | RESERVED | INITIALIZED WITH 0 AND IGNORE ON READ | R/W |

FIG. 16

| BITS | NAME | DESCRIPTION | R/W |
|---|---|---|---|
| 15 | CS_ON | 1=AN INTERRUPT OF CS SIGNAL BECOMES ASSERTED HAS BEEN GENERATED<br>0=CS_ON INTERRUPT IS NOT GENERATED | R |
| 14 | CS_OFF | 1=AN INTERRUPT OF CS SIGNAL BECOMES ASSERTED HAS BEEN GENERATED<br>0=CS_OFF INTERRUPT IS NOT GENERATED | R |
| 13 | CD_ON | 1=AN INTERRUPT OF CD SIGNAL BECOMES ASSERTED HAS BEEN GENERATED<br>0=CD_ON INTERRUPT IS NOT GENERATED | R |
| 12 | RxON_ON | 1=AN INTERRUPT OF RxON_ON SIGNAL BECOMES ASSERTED HAS BEEN GENERATED<br>0=RxON_ON INTERRUPT IS NOT GENERATED | R |
| 11 | RxON_BkON | 1=AN INTERRUPT OF RxON SIGNAL BECOMES ASSERTED DURING THE BACK OFF SLOTS HAS BEEN GENERATED<br>0=RxON_BkON INTERRUPT IS NOT GENERATED | R |
| 10 | RxErr_ON | 1=AN INTERRUPT OF RxErr SIGNAL BECOMES ASSERTED HAS BEEN GENERATED<br>0=RxErr_ON INTERRUPT IS NOT GENERATED | R |
| 9 | PHY RxFifo OVERRUN | 1=AN INTERRUPT OF PHY's RECEIVE FIFO OVERRUN HAS BEEN GENERATED<br>0=THIS INTERRUPT IS NOT GENERATED | R |
| 8 | PHY TxFifo UNDERRUN | 1=AN INTERRUPT OF PHY's TRANSMIT FIFO IS UNDERRUN HAS BEEN GENERATED<br>0=THIS INTERRUPT IS NOT GENERATED | R |
| 7 | PHY SAMPLE DATA READY | 1=AN INTERRUPT OF PHY's SAMPLE DATA IS READY FOR DSP PROCESSING HAS BEEN GENERATED<br>0=THIS INTERRUPT IS NOT GENERATED | R |
| 6 | PHY LOG DATA | 1=AN INTERRUPT OF PHY's LOG DATA IS READY FOR DSP/HOST TO SAMPLE<br>0=THIS INTERRUPT IS NOT GENERATED | R |
| 5~0 | RESERVED | IGNORE ON READ | R |

FIG. 17

| BITS | NAME | DESCRIPTION | R/W |
|---|---|---|---|
| 15 | RESET | 1=PHY RESET<br>0=NORMAL OPERATION | R/W |
| 14 | LOOPBACK | 1=ENABLE LOOPBACK MODE<br>0=DISABLE LOOPBACK MODE | R/W |
| 13 | BAUDRATE SELECTION | 1=4MBAUD SUPPORTED<br>0=4MBAUD NOT SUPPORTED | R/W |
| 12,11 | MODE SLECTION | 00=2.0 MODE<br>01=1.0 MODE<br>10= COMPATIBILIY MODE<br>11=MODE AUTOMATIC SELECTION | R/W |
| 10 | COLLISION TEST | 1=ENABLE CD SIGNAL TEST<br>0=DISABLE CD SIGNAL TEST | R/W |
| 9 | POWER MODE | 1=LOW POWER STATE<br>0=NORMAL POWER STATE | R/W |
| 8:0 | RESERVED | WRITE AS 0, IGNORE ON READ | R/W |

FIG. 18

| BITS | NAME | DESCRIPTION | R/W |
|---|---|---|---|
| 15 | RESERVED | WRITE AS 0, IGNORE ON READ | R |
| 14 | LOOPBACK | 1=PHY IS IN LOOPBACK MODE<br>0=PHY IS NOT IN LOOPBACK MODE | R |
| 13 | BAUDRATE SELECTION | 1=PHY SUPPORTS 4MBAUD<br>0=PHY DOES NOT SUPPORT 4MBAUD | R |
| 12,11 | MODE STATUS | 00=PHY IS IN 2.0 ONLY MODE<br>01=PHY 1.0 ONLY MODE<br>10=PHY IS IN COMPATIBILITY MODE<br>11=PHY IS IN AUTOMATIC SELECTION MODE | R |
| 10 | RESERVED | WRITE AS 0 IGNORE ON READ | R |
| 9 | POWER MODE | 1=PHY IS IN LOW POWER STATE<br>0=PHY IS IN NORMAL POWER STATE | R |
| 8:0 | RESERVED | WRITE AS 0, IGNORE ON READ | R |

FIG. 19

| REGISTER INDEX | REGISTER NAME | DESCRIPTION | R/W | IMPLEMENTATION |
|---|---|---|---|---|
| 0 | TxFRAME LENGTH | BYTE COUNT OF FRAME TRANSMITTED FROM MAC TO PHY | PHY READ | PHY |
| 1 | RxFRAME LENGTH | BYTE COUNT OF FRAME TRANSMITTED FROM PHY TO MAC | PHY WRITE | PHY |
| 2 | SIGNAL CONTROL | MAC/PHY INTERFACE SIGNAL CONTROL REGISTER | PHY WRITE | PHY |
| 3 | SIGNAL STATUS | MAC/PHY SIGNALING STATUS | PHY READ | PHY |
| 4 | CRC32 HIGH REGISTER | CRC32 HIGH 16 BITS | PHY WRITE | PHY |
| 5 | CRC32 LOW REGISTER | CRC32 LOW 16 BITS | PHY WRITE | PHY |
| 6 | CRC16 REGISTER | CRC16 | PHY WRITE | PHY |
| 7 | PHY MANAGEMENT CONTROL REGISTER | DESCRIBED IN 5.0 | PHY READ | PHY |
| 8 | PHY MANAGEMENT STATUS REGISTER | DESCRIBED IN 5.0 | PHY WRITE | PHY |

FIG. 20

| BITS | NAME | DESCRIPTION | R/W |
|---|---|---|---|
| 15 | RxON | 1=SET RxON SIGNAL<br>0=CLEAR RxON SIGNAL | R/W |
| 14 | RxV1M1 | 1=SET RxV1M1 SIGNAL<br>0=CLEAR RxV1M1 SIGNAL | R/W |
| 13 | CS | 1=SET CS SIGNAL<br>0=CLEAR RX SIGNAL | R/W |
| 12 | CD | 1=SET CD SIGNAL<br>0=CLEAR CD SIGNAL | R/W |
| 11 | RxErr | 1=SET RxErr SIGNAL<br>0=CLEAR RxErr SIGNAL | R/W |
| 10~0 | RESERVED | WRITE AS 0, IGNORE ON READ | R/W |

FIG. 21

| REGISTER INDEX | REGISTER NAME | DESCRIPTION | R/W | IMPLEMENTATION |
|---|---|---|---|---|
| 0 | SAMPLE DATA ADDRESS | SAMPLE DATA BUFFER START ADDRESS | DSP WRITE | DSP |
| 1 | SAMPLE DATA LENGTH | THE NUMBER OF DATA BYTES NEED TO BE TRANSFERRED FROM THE PHY | DSP WRITE | DSP |
| 2 | Rx SAMPLE DATA LENGTH | THE NUMBER OF DATA WORDS (16 BIT) ACTUALLY TRANSFERRED FROM THE PHY | DSP READ | PHY |
| 3 | DSP DATA LENGTH | THE NUMBER OF DATA WORDS (16 BIT) ACTUALLY TRANSFERRED FROM THE PHY | DSP WRITE | DSP |
| 4 | DSP DATA PORT | DSP DATA OUTPUT PORT | DSP WRITE | DSP |

FIG. 22

| REGISTER INDEX | REGISTER NAME | DESCRIPTION | R/W | IMPLEMENTATION |
|---|---|---|---|---|
| 0 | Rx SAMPLE DATA LENGTH | THE NUMBER OF DATA WORDS (16 BIT) ACTUALLY TRANSFERRED FROM THE PHY TO THE DSP | PHY WRITE | PHY |
| 1 | DSP DATA LENGTH | THE NUMBER OF DATA BYTES NEEDED TO BE TRANSFERRED TO THE PHY | PHY READ | DSP |
| 2 | DSP DATA PORT | DSP DATA INPUT PORT | PHY READ | PHY |

PROGRAMMABLE MULTI-STANDARD MAC ARCHITECTURE

The invention is related to and claims priority under 35 USC 119(e)(1) from the following co-pending U.S. Provisional Patent Application Ser. No. 60/172,516 by Lu et al., entitled A Programmable Multi-standard MAC Architecture, and filed on Dec. 17, 1999; and Ser. No. 60/172,541 by Lu et al., entitled DSP Core/PHY Interface Specification, and filed on Dec. 17, 1999. In addition, the invention is related to the simultaneously filed co-pending U.S. Patent Application Ser. No. 09/737,722, entitled MAC/PHY Interface, by Lu et al. All of the aforementioned patent applications are hereby incorporated by reference.

BACKGROUND OF THE INVENTION

1. Technical Field of the Invention

The present invention relates generally to the field of communication networks and, more particularly, to a programmable Media Access Control implementation method and architecture.

2. Description of Related Art

FIG. 1 shows a diagrammatic representation of an open systems interconnection (OSI) layered model 10 developed by the International Organization for Standards (ISO) for describing the exchange of information between layers in communication networks. The OSI layered model 10 is particularly useful for separating the technological functions of each layer, and thereby facilitating the modification or update of a given layer without detrimentally impacting on the functions of neighboring layers. At a lower most layer, the OSI model 10 has a physical layer or PHY layer 12 that is responsible for encoding and decoding data into signals that are transmitted across a particular medium. Above the PHY layer 12, a data link layer 14 is defined for providing reliable transmission of data over a network while performing appropriate interfacing with the PHY layer 12 and a network layer 16. The Network layer 16 is responsible for routing data between nodes in a network, and for initiating, maintaining and terminating a communication link between users connected to the nodes. A. Transport layer 18 is responsible for performing data transfers within a particular level of service quality. A Session layer 20 is generally concerned with controlling when users are able to transmit and receive data. A Presentation layer 22 is responsible for translating, converting, compressing and decompressing data being transmitted across a medium. Finally, an Application layer 24 provides users with suitable interfaces for accessing and connecting to a network.

The IEEE Local Area Network (LAN) standards divide the Open System Interconnection (OSI) data link layer into two sub-layers as illustrated in FIG. 1: the Media Access Control (MAC) 14b and the Logical Link Control (LLC) 14a. The LLC layer 14a is generally a software function that is responsible for attaching control information to the data being transmitted from network layer 16 to MAC layer 14b. The MAC layer 14b deals with the media access techniques utilized to control the access to a shared physical medium 26. The MAC layer 14b is primarily responsible for controlling the flow of data over a network, ensuring that transmission errors are detected, and ensuring that transmissions are appropriately synchronized. Token Ring and Ethernet are two legacy implementations of a MAC layer which use different methods to share the physical media. These two MAC types are typically implemented in an integrated circuit (IC) hardwired because of its technology maturity.

With technology development in the broadband communication area, bigger and faster data communication pipes are being established from homes and small offices to network servers and the Internet. The LAN technology has been extended to cover the home and small office environment, usually called Home Networking. The most prevalent high-speed home networking technologies in the industry are: HPNA 2.0/1.0, legacy Ethernet and 802.11 wireless LAN. These three technologies use a shared media access control method to access the physical layer phone wires, Ethernet cables and wireless media.

Although the MACs of these home LANs share some common features, each MAC maintains respective specialties. HPNA 1.0 and Ethernet MAC both use standard IEEE 802.3 CSMA/CD (Carrier Sense Multiple Access with Collision Detection), which uses a binary exponential backoff algorithm to defer its transmission when media is busy. HPNA 2.0 MAC added a Distributed Fair Priority Queuing (DFPQ) deferring algorithm in addition to the CSMA/CD to provide the Quality of Service (QOS) guarantee at the physical layer. The HPNA 2.0 also generally allows two types of MAC architectures: a CSMA/CD with DFPQ type MAC and a standard 802.3 MAC with DFPQ Enhanced MAC (EMAC) or two layer MAC. Each has its advantages and disadvantages. IEEE 802.11 wireless LAN uses Carrier Sense Multiple Access with Collision Avoidance (CSMA/CA) and NAV (Network Access Vector) technologies in the MAC layer for the assumption that each station cannot be guaranteed to be able to detect other stations in the wireless communications network.

In addition to the current requirements of the different MAC architectures and MAC implementations for various standards, development of the new home LAN technology, for example, is causing existing MAC standards to evolve and/or new MAC standards to emerge. Therefore, it would be advantageous to provide a new software based or programmable MAC implementation architecture which would speed up MAC implementation development, MAC/PHY and MAC/host integration, enable multiple MAC implementations, and increase MAC portability for different applications and platforms.

SUMMARY OF THE INVENTION

The present invention achieves technical advantages as a method, system and apparatus for managing data flow over an open system interconnection type network which includes a physical layer and media access control layer. The invention implements a plurality of operating modules each enabling a respective media access control layer operating function in which at least a portion of the operating modules are implemented in independent software. The invention further implements a host interface module for communication between a host processor and the media access control layer, a physical layer interface for communication between the physical layer and media access control layer, and an inter-module programming interface for communication between the respective operating modules.

BRIEF DESCRIPTION OF THE DRAWINGS

For a more complete understanding of the present invention, reference is made to the following detailed description taken in conjunction with the accompanying drawings wherein:

FIG. 1 illustrates an open systems interconnection (OSI) layered model;

FIG. 2 shows a block diagram of a modulized soft MAC architecture in accordance with an embodiment of the present invention;

FIG. 3 shows a block diagram of another embodiment of a modulized soft MAC architecture in accordance with the present invention;

FIG. 4 illustrates a Queue Descriptor and associated Data Buffers in accordance with an embodiment of the present invention;

FIG. 5 illustrates a control signal or message exchange by a host and MAC controller supporting Queue Manager Protocol operation in accordance with an embodiment of the present invention;

FIG. 12 shows a tabulated MAC/PHY interface register set accessible to the MAC controller in accordance with an aspect of the present invention;

FIG. 13 shows a tabulated bit assignment set for the control register of the MAC/PHY interface shown in FIG. 12;

FIG. 14 shows a tabulated bit assignment set for the status register shown in FIG. 12;

FIG. 15 shows a tabulated bit assignment set for the Interrupt Mask register shown in FIG. 12;

FIG. 16 shows a tabulated bit assignment set for the Interrupt Status register shown in FIG. 12;

FIG. 17 shows a tabulated bit assignment set for the PHY Management Control register shown in FIG. 12;

FIG. 18 shows a tabulated bit assignment set for the PHY Management Status register shown in FIG. 12;

FIG. 19 shows a tabulated MAC/PHY interface register set accessible to the PHY in accordance with an aspect of the present invention;

FIG. 20 shows a tabulated bit assignment set for the Signal Control register shown in FIG. 19;

FIG. 21 shows a tabulated DSP/PHY interface register set accessible to the DSP in accordance with an aspect of the present invention;

FIG. 22 shows a tabulated DSP/PHY interface register set accessible to the PHY in accordance with an aspect of the present invention;

DETAILED DESCRIPTION OF THE INVENTION

Figure 6:
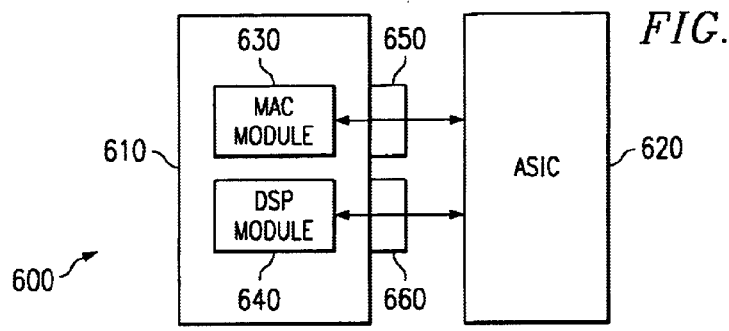
FIG. 6 illustrates a preferred embodiment of a HomePNA digital chipset in accordance with an aspect of the present invention.

The numerous innovative teachings of the present application will be described with particular reference to the presently preferred exemplary embodiments. However, it should be understood that this class of embodiments provides only a few examples of the many advantageous uses and innovative teachings herein. In general, statements made in the specification of the present application do not necessarily delimit any of the various claimed inventions. Moreover, some statements may apply to some inventive features, but not to others.

Referring now to FIG. 2 there is illustrated a soft MAC 210 in accordance with a preferred embodiment of the present invention. The soft MAC 210 is divided into the following modules and each module provides standard APIs for inter-module communication purposes: MAC transmitter module 220; MAC receiver module 230; Deference algorithm module 240; MAC statistical information maintenance module 250; Other management function module 260; and MAC utility module 270.

The MAC transmitter module 220 enables preprocessing of the packet transmission to the PHY layer which includes packet framing, transmit condition checking based on the output of the deference algorithm i.e., media is busy.

The MAC receiver module 230 enables preprocessing of the packet received from the PHY layer which includes packet recognition, packet format checking, error checking, statistical information report to the statistical maintenance module 250.

The deference algorithm module 240 implements the backoff algorithm when the media is busy and the transmitter has to delay its current packet transmission to a later time. A typical/standard deference algorithm includes BEB (Binary Exponential Backoff) used in the 802.3 MAC.

The MAC statistical maintenance module 250 stores all the needed statistical data for the MAC layer. Typical statistical information includes number of packets transmitted/received, number of bytes transmitted/received, number of packets received with errors, number of packets transmitted with deferring, etc.

The other management function module 260 coordinates the functioning of each individual modules such as scheduling and added Quality of Service support in the MAC layer which is not included in the deference algorithm module 240.

The MAC utility module 270 enables the functions that are being used in more than one module in the MAC, such as error checking/calculation, to be shared among multiple MAC modules.

Splitting MAC software into the above modules with standard API definitions enables certain MAC functions to be moved off-chip into other processors or hardware as is necessary for a specific implementation to meet cost or speed requirements, for example. The separate MAC software module architecture further enables combining the similar functionality, of devices implementing differing MAC standards, in a single module. Thus, in the home networking area, for example, the Deference Algorithm module 240 implements BEB on HPNA 1.0 or Ethernet 802.3 MAC, DFPQ on HPNA 2.0, and CSMA/CA and NAV on 802.11 MAC implementations.

Additionally, many of the different standard MAC implementations share the same utility functions (such as cyclic redundancy checks, randomizers, address filtering, etc.) which can be implemented in the utility module 270.

Further, special management functions for each of the aforementioned MAC implementations can be implemented in the separate Other Management Module 260 to increase portability. For example, a 802.11 MAC contains special station management functions such as authentication, association, roaming, and other management functions known in the art.

The MAC modules can be dynamically downloaded from other devices. The download of the software MAC modules are based on a specific application platform, such as, downloaded from a FLASH in the system or from host controller, etc.

Referring now to FIG. 3 there is illustrated a block diagram of an implementation of the modulized soft MAC together with part of the PHY in a single DSP processor in accordance with the present invention. The illustrated soft MAC architecture 300 contains the following components in addition of the core MAC software modules described before: A Host/MAC Interface 305 in which a queue manager is defined to manage the frame data and control information communication between a host and the MAC layer through various hardware bus interfaces such as PCI, for example; a MAC/PHY Interface 310 in which interface communication is defined to manage an enhanced MII interface between the MAC layer and the PHY layer; a modulized soft MAC 315 or a modular organized software architecture, which contains multiple MAC layer software modules 320, 325, 330, 335, 340 as described before; an Inter-MAC communication protocol which is a simplified communication protocol/APIs (not shown) for enabling communication between the MAC software modules which may be split between multiple processors or between hardware and software; and an optional scheduler 345 used to schedule MAC module processes and MAC and PHY layer processing.

Further, for a MAC architecture used to implement part of or the whole PHY layer operating functions (i.e., PHY processing software and PHY hardwired circuits), it is preferred to have a resource management scheduler 345 implemented with this MAC architecture to guarantee that the processing of the PHY layer functions do not interrupt the MAC layer module functioning. Also, a scheduler can be used to handle different MAC modules running at different priorities.

In some embodiments, the modulized soft MAC 315 is implemented in a microprocessor or MAC controller 300. For MAC implementations of HomePNA 2.0/1.0 and 802.11, the MAC controller 300 supports real-time response at $\mu s$ resolution (for example, the interrupt latency is less than 1 $\mu s$).

In a specific MAC, the timing control for a deference algorithm is under certain resolution, i.e., several microseconds for HomePNA MAC. This requires the software implementation of the deference module in a micro-controller to be able to achieve the deterministic timing response at microseconds resolution. A CPU that does not meet this requirement, will not be able to support the MAC software implementation.

The MAC module 300 also supports at least two levels of processing priority (such as IRQ level and normal processing level), since multiple modules are executing "in parallel" under the MAC layer. For example, while the transmitter modules are transmitting, the deference module is running "in parallel" to check if media is busy, if busy then deferring, and the receive module is also checking the packet receive condition. In order to guarantee the "parallel" processing, at least two levels of priority are supported to provide "critical" versus "non-critical" processing.

AFE I/F 360 is the interface between the physical layer PHY and the analog front end which converts analog signals into digital signals or vice versa.

DSP I/F 355 is the interface to allow the part of the PHY layer functions implemented inside a DSP to interface with the hardware PHY.

The MAC controller 300 further includes, in some embodiments, an associated timer (not shown) with interrupt at $\mu s$ counting/timing resolution (for example, it can periodically generate interrupts every 1 $\mu s$ if necessary). The timer can be included off-chip of as an external timer circuit.

For some implementations in which PHY layer processing co-exists in the MAC controller 300, the PHY processing is included in a PHY processing software module 350. Further, in some embodiments, the MAC controller 300 is a DSP, for example, for those implementations which include PHY processing and modulized soft MAC modules on the same processing chip. The MAC controller 300 has MIPS and on-chip memory (both program memory and data memory) to support software MAC functions and DSP functions if applicable. The associated clock rate is synchronized with an external PHY layer clock rate if applicable.

The MAC/PHY interface 310 includes: the hardware interface and the MAC/PHY software interface module which resides in the MAC controller 300 and manages the hardware interface. The hardware interface between the MAC and PHY is defined as a MII or a MII enhanced interface specification. The MII Interface is specified by IEEE 802.3. The MAC/PHY interface 310 can be implemented using the standard MII when it is possible. However, an enhanced MII can be used to accommodate additional signal lines and/or increase the data bus width for implementation which include PHY processing and soft MAC modules on the same processing chip. The enhanced MII interface for a HomePNA MAC/PHY is described in more detail in following sections of the present Detailed Description. An independent MAC/PHY interface module can be implemented in the MAC controller 300 to handle the MII interface or enhanced MII interface underneath. If the PHY is completely implemented together with the MAC in the MAC controller (such as a DSP engine) the difference between this configuration and the hardware MII interface is hidden within the MAC/PHY interface module.

The Host/MAC Interface 305 is defined and supported by the underlying hardware bus interface. The hardware bus interface supports master/slave bus modes, enables data frames stored in host bus memory to be moved directly into MAC controller buffer memory or FIFO (DMA), enables control and status information exchanges between host and MAC controller 300 and enables event alerts (such as interrupts) between host and MAC controller 300.

A data communication protocol across the Host/MAC Interface 305 is used to provide general purpose data frame exchanges between the host and MAC controller. This protocol is referred to herein as Queue Manager Protocol. The Queue Manager Protocol provides a standard access method between the MAC and host, hiding the hardware interface underneath the Host/MAC Interface 305. The Queue Manager Protocol is implemented by respective software modules on both host side and MAC controller side to communicate based on Queue Manager data structures.

The Queue Manager protocol includes the following components: Queue Descriptor, Data Buffer and Frame. FIG. 4 illustrates a Queue Descriptor 410 and associated Data Buffer 420 in accordance with an embodiment of the present invention. The Queue Descriptor 410 is a data structure in host memory that is composed of pointers to the Data Buffers 420. It includes information about the location of a frame and frame size. One Queue Descriptor can represent only one frame, but it can be linked to form a data queue that represents multiple frames.

The Data Buffer 420 is an allocated area in host memory where a frame fragment is located. The Data Buffer 420 serves as a location to where the MAC controller 300 can DMA a received frame and from where the MAC controller 300 can DMA a frame to be transmitted. A Data Buffer 420 can store a whole frame or part of the frame. It preferably does not hold more than one frame. The Queue Descriptor 410 can point to one or more Data Buffers 420 for the frame(s) associated with those Data Buffers.

A Frame represents the data that is to be transmitted on the network. The frame format is defined based on a specific application.

Queue descriptors can be linked together by setting the forward pointer 430 in the first field of the Queue Descriptor 410 to indicate a transmit or receive queue. The queue allows the MAC controller 300 to process more than one frame without a separate transmit/receive command for each frame. The host can keep transmit and receive queues continuously open by freeing up buffers and relinking queue descriptors faster than frames are transmitted. This is an important aspect in receive operations where the receive queue must be open continuously to avoid losing frames from the network.

The Forward Pointer 430 is a 4 bit field which contains a pointer to the next queue descriptor in the same queue. There may be some address limit on the start of a queue descriptor. When the pointer is 0, the current queue descriptor is the last one in the queue. When the last queue descriptor is processed, an event alert is raised for the queue.

The FrameStat 440 and FrameSize 450 fields are each 2 bits. The FrameStat 440 field is written by the host when a queue descriptor is created. It is overwritten by the MAC controller 300 to report the frame completion status. The bit definitions of the FrameStat 440 field are application specific. The FrameSize 450 field indicates the number of bytes in the frame described by the queue descriptor 410. For transmitting, this field is written by the host to represent the actual frame size to be transmitted. For receiving, the FrameSize 450 field is written by the MAC controller 300 upon the completion of the frame reception.

The Data Count 460 field is four bits and indicates the maximum number of frame data bytes stored or to be stored in the data buffer 420. For receiving, it is initially written by the host with the data buffer size, and overwritten by the MAC controller 300 with the actual data byte counts upon completion of the data fragment reception. The total number of the data count will equal the frame size. A data count of 0 indicates the end of data fragments in one frame.

The Data Buffer Address field 470 is four bits which defines a pointer to a fragment of the frame data stored in data buffer 420.

Referring now to FIG. 5 there is illustrated a control signal exchange by the host 510 and MAC 520 controller which support the aforementioned Queue Manager Protocol. The following signals are passed from the host 510 to the MAC 520 controller in an exemplary embodiment: QstartAddr—the start address of the first queue descriptor in a queue, which is the linked list of queue descriptors. Each time the queue descriptor link list is relinked for the usage of the recycled data buffers, the new start address is passed to the MAC controller 520; Qcontrol—includes some control information that is application specific; QlazyNotify—indicates the number of frames needed to be processed before an event alert is raised from MAC controller 520 to host 510; and QnotifyTimeout—indicates the time out value in bus cycles that an expected event alert was not received by the host 510.

Additionally, to support the Queue Manager Protocol operation, the Queue Manager module on the MAC controller side supports the following event alerts in an exemplary embodiment: FrameProcessedAlert—indicates that a frame or multiple frames has been processed by the MAC controller 520; EndOfQueueAlert—indicates that an end of queue condition has been met; QnotifyTimeOutAlert—indicates that a specified time out value has been met; and AppSpecificAlert—indicates other application specific alerts.

Under most cases one transmit queue and one receive queue are used for Queue Manager implementations. In other embodiments, multiple transmit queues based on frame data priorities are supported based on the requirements of a specific application.

In some embodiments, some of the soft MAC modules can be moved from the MAC controller 300 to other processors or implemented in hardware accelerators or circuits. In one embodiment, each soft MAC module implements the following exemplary Application Programming Interfaces (APIs) to allow easy Inter-MAC communication implementations:

SMAC_Read( );
SMAC_Write( );
SMAC_IOHandler( );
SMAC_CmdHandler( ); and
SMAC_StatHandler( ).

The SMAC_Read( ) and SMAC_Write( ) APIs are used for block data communication among soft MAC modules both synchronously and asynchronously. SMAC_IOHandler( ) is called to handle the asynchronous data communication. SMAC_CmdHandler( ) handles command queuing among different modules. A command code is used for pass module specific commands. SMAC_StatHandler( ) is used for processing the status queue received from other modules and includes processing specific alerts from other modules. When two soft MAC modules are implemented in different processors, these APIs can be implemented based on the specific kind of inter-processor communication platforms supported. If one module is implemented in a hardware accelerator, these APIs can be implemented in a pseudo module that drives the hardware accelerator.

Referring now to FIG. 6 there is illustrated a HomePNA digital chip set 600 utilizing an enhanced MII, in accordance with the present invention, for embodiments in which MAC operating functions and PHY layer digital signal processing functions are implemented in a single processor. The chip set 600 includes a DSP core 610 and a physical layer transceiver ASIC 620. The DSP core 610 includes a MAC module 630 and a DSP module 640. The MAC module 630 and the DSP module 640 are in communication with the ASIC 620 through two individual interfaces: MAC/PHY interface 650; and DSP/PHY interface 660. These two interfaces are logically separated but can share the same hardware components, if necessary, during implementation.

The purpose of the MAC/PHY interface 650 is to provide a Media Independent Interface (MII) type interconnection between the MAC module 630 and the PHY layer, and the purpose of the DSP/PHY interface is to provide an intercommunication channel between the DSP module 640 and the PHY layer, in which part of the PHY layer digital signal processing is implemented in the DSP module. The following described MAC/PHY MII type interconnection can also be used for implementation in which the MAC and PHY are implemented in hardwired circuits.

The MAC/PHY interface 650 has the following characteristics in some embodiments: data transmissions between the MAC module 630 and the ASIC 620 are synchronous to a clock reference at 32 Mhz for data transfer at up to 32

Mbps; independent eight bit wide transmit and receive data paths; and a simple PHY management interface that can be accessed by both a MAC and a host controller.

Figure 7:
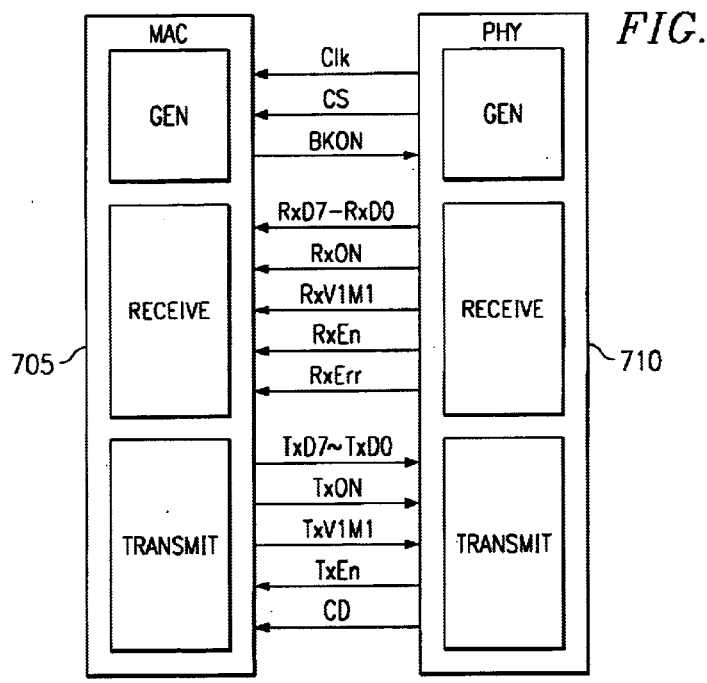
FIG. 7 illustrates an MII extended MAC/PHY interface signals in accordance with an aspect of the present invention.

Referring now to FIG. 7 there is shown an interface signal exchange between the MAC 705 portion and the PHY 710 portion of the HomePNA digital chip set 600 in accordance with an exemplary embodiment of the present invention. The transmit data bits (TxD7–TxD0) are driven by the MAC 705. TxD7–TxD0 transition synchronously with respect to the Clk. For each period of the Clk when both the Transmit On (TxON) and Transmit Enable (TxEn) signals are asserted, TxD7–TxD0 are valid and available to the PHY 710. The TxD7–TxD0 signals remain unchanged until the TxEn signal is asserted. While TxON or TxEn is de-asserted, TxD7–TxD0 has no effect upon the PHY 710. TxD7 is the most significant bit (MSB) and TxD0 is the least significant bit (LSB). The TxD7–TxD0 bits are extended from MII interface bits TxD3–TxD0 into an eight bit data bus for the purpose of the data direct memory access (DMA) from the DSP.

Figure 8:
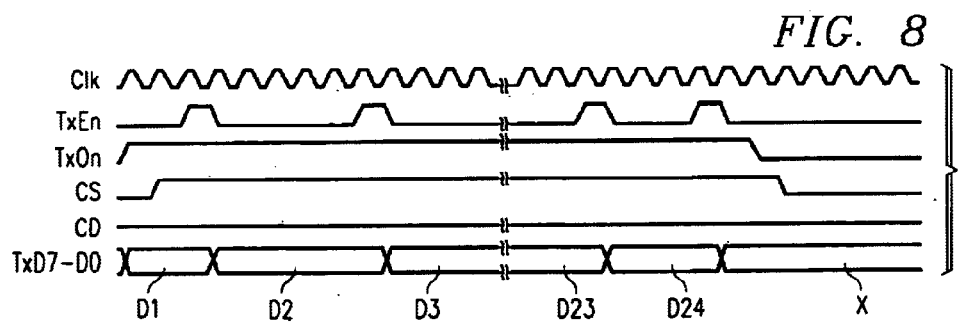
FIG. 8 shows relative interface signal timing during frame transmission with no collisions.

The TxON signal is used for two purposes: transmit frame and transmit backoff signal. This signal has been modified from a MII interface to accommodate the HomePNA backoff signals after collision. Regarding transmit frame, TxON indicates that the MAC 705 is presenting a frame on TxD7–TxD0 for transmission. It is asserted by the MAC 705 synchronously with the first byte of a Frame Control field of a HomePNA 2.0 frame and remains asserted while all the bytes being transmitted are presented to the PHY 710. When TxON is asserted, the PHY 710 uses the TxEn signal to indicate that TxD7–TxD0 are valid with a new data byte. For HomePNA systems, the PHY 710 transmits a frame prepended with PEAMBLE64 to the wire. PREAMBLE64 is a HomePNA PHY layer framing header known in the art. The PHY 710 continues to transmit until TxON is de-asserted. The PHY 710 ends transmission with EOF. Preferably, TxON is asserted for at least 92.5 μs (TX_FRAME). FIG. 8 shows the relative timing of the TxON signal in relation to a frame transmission with no collisions.

Referring back to FIG. 7, a Backoff Signal Slot On (BkOn) is used by the MAC 705 to indicate the start of a backoff signal slot. The PHY 710 uses the assertion of the BkOn signal as a directive to begin monitoring the wire for any backoff signal received on the wire. The duration of BkON is 3×32 μs=96 μs in one embodiment. While BkON signal is asserted, TxON assertion means that the MAC 705 requests the PHY 710 to apply one backoff signal to the wire. From the time TxON is asserted while BkON is asserted, the PHY 710 applies the backoff signal within, for example, a 2 μs limit.

A 1.0 Mode On (TxV1M1) assertion indicates that an HPNA 1.0 frame is being transmitted on TxD7–TxD0 during TxON assertion. TxV1M1 remains asserted during the entire period of frame transmission. The TxV1M1 signal is a new signal on top of a MII interface.

The reference clock (Clk) is a continuous clock locked, for example, at 32 MHz and is sourced by the PHY 710. The Clk provides the timing reference for the TxON, TxEn, and TxD7–TxD0 signals for data transmission from the MAC 705 to the PHY 710. The Clk also provides the timing reference for the transfer of RxON, RxEn, and RxD7–RxD0 signals for data transmission from the PHY 710 to the MAC 705.

The receive bits RxD7–RxD0 signals transition synchronously with respect to the Clk signal. RxD7–RxD0 are driven by the PHY 710. For each Clk period in which both RxON and RxEn are asserted, RxD7–RxD0 provides eight valid bits of decoded data from the PHY 710 to the MAC 705. RxD7-R-xD0 remain valid while a Receive Enable (RxEn) signal is asserted. While Receive Data On (RxON) or RxEn is de-asserted, RxD7–RxD0 are invalid. RxD7 is the most significant bit (MSB) and RxD0 is the least significant bit (LSB). The RxD7–RxD0 bits are extended from MII interface bits RxD3–RxD0 into an eight bit data bus for the purpose of the data direct memory access (DMA) to the DSP.

Figure 9:
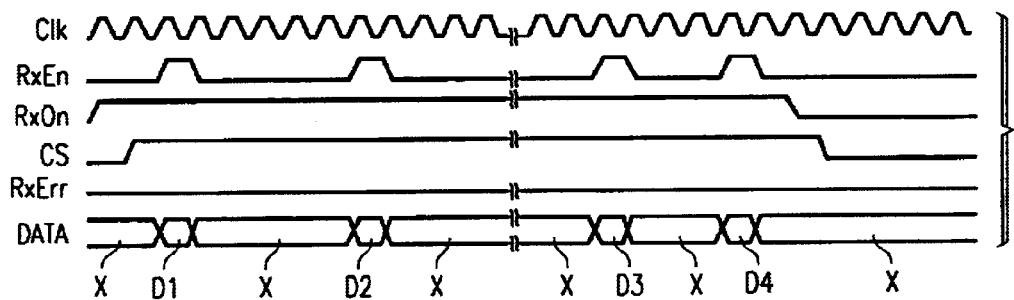
FIG. 9 shows relative interface signal timing during frame reception without error.

The RxON signal is used for two purposes: receive Frame and receive backoff signal. The use of this signal has been modified from a MII interface to accommodate the HomePNA backoff signals after collision. For frame receiving, the RxON is provided by the PHY 710 to indicate that the PHY 710 has valid decoded data bits on RxD7–RxD0. The data on the RxD7–RxD0 is synchronous to the Clk and RxON transitions synchronously with respect to the Clk. Further, RxON remains asserted continuously from the first decoded bit of a frame (without preamble) through the final bit of the frame (without EOF) and is negated prior to the first Clk cycle that follows the final nibble. Upon RxON assertion, the PHY 710 starts sending the RxEn signal which indicates that a valid data byte is present on RxD7–RxD0. FIG. 9 shows the relative timing of RxON during a frame reception.

Referring back to FIG. 7, the RxON signal is also used by the PHY 710 to indicate that a backoff signal has been received while BkON is asserted by the MAC 705. The latency between the backoff signal appearing on the wire and the RxON being asserted is approximately 10 μs=δ. The δ is the minimum backoff signal decoding time. RxON signal remains asserted until the end of the current signal slot (32 μs).

The TxEn signal is sourced by the PHY 710 to signal the MAC 705 to place new data on TxD7–TxD0. Once TxON is asserted, the PHY 710 provides TxEn pulses (one pulse is 1/32 MHz cycle wide) to indicate that the MAC 705 can place new valid data on TxD7-TxDO. The average rate of the TxEn pulses is the transmission data rate in bytes, which is about 4 MHz for a 32 Mbps data rate. This signal provides for transmitting data between the MAC 705 and the PHY 710 at a variable rate which matches the PHY's data rate. Upon de-assertion of the TxON signal, the PHY 710 stops supplying TxEn pulses. The TxEn signal timing during a data transmission from the MAC 705 to the PHY 710 is shown in FIG. 8.

Referring back to FIG. 7, the RxEn signal is sourced by the PHY 710 to signal the MAC 705 that new data has been placed on RxD7–RxD0 signal lines. The RxEn signal is only valid while the RxON signal is asserted. The average rate of the RxEn signal pulses will be the transmission data rate in bytes, which is around 4 MHz for a 32 Mbps data rate. This signal provides for transmitting data between MAC 705 and PHY 710 at a variable rate to match the PHY's data rate. RxEn signal operation during data transmission from the PHY 710 to the MAC 705 is shown in FIG. 9.

Figure 10:
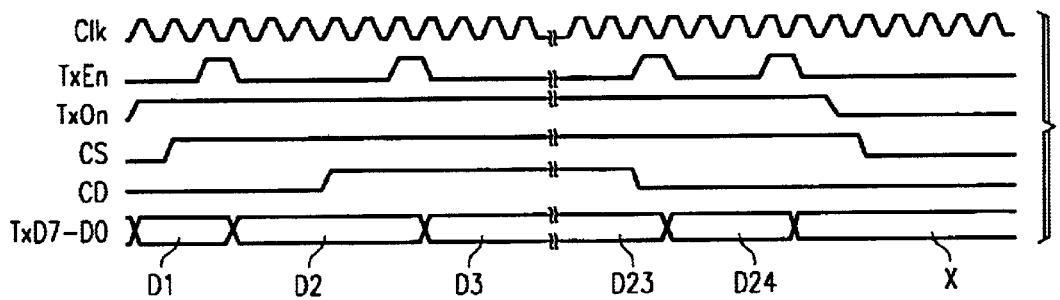
FIG. 10 shows relative interface signal timing during frame transmission with a collision.

The Carrier Sense (CS) signal is asserted by the PHY 710 when either transmit or receive medium is non-Idle and CS is de-asserted by the PHY 710 when both transmit and receive media are idle. The PHY insures that the CS signal remains asserted throughout the duration of a collision condition. The CS is not required to transition synchronously with respect to the Clk. The MAC 705 uses this signal to accomplish the "deference" procedure. Further, the CS is not asserted when line noise is detected on the wire. FIG. 8 depicts the behavior of CS during frame transmission without a collision, while FIG. 10 shows the behavior of CS during a frame transmission with a collision.

A Collision Detected signal (CD) is asserted by the PHY 710 upon detection of a collision on both transmit and receive media, and remains asserted while the collision condition persists. The CD is not required to transition synchronously with respect to the Clk signal and it remains asserted for at least 32 µs (CD_MIN). FIG. 10 shows the relative timing of CD during a frame transmission with a collision.

Figure 11:
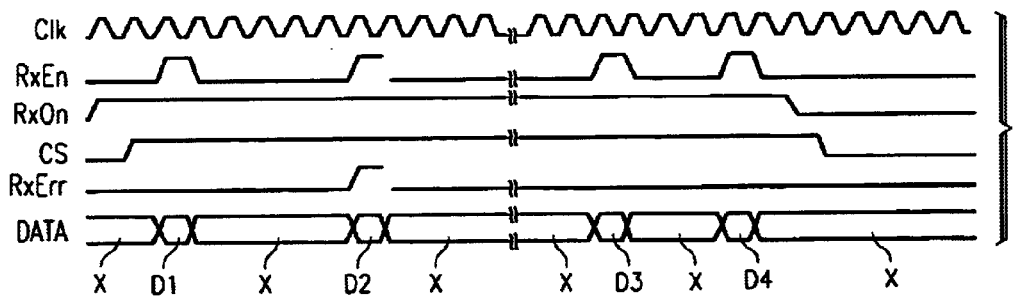
FIG. 11 shows relative interface signal timing during frame reception with errors.

A Receive Error signal (RxErr) is generated by the PHY 710 and is asserted for one or more Clk periods to indicate to the MAC 705 that an error (e.g. a coding error, or any error detected by the PHY 710 that may otherwise be undetectable at the MAC layer) was detected in the frame presently being transferred from the PHY 710 to the MAC 705. RxErr transitions synchronously with respect to the Clk. While RxON is de-asserted, RxErr is treated as invalid. FIG. 11 shows the relative timing of RxErr during the reception of a frame with errors.

A Receive HPNA 1.0 Frame (RxVIMI) signal is provided by the PHY 705 to indicate a detection of a HPNA 1.0 frame. This signal is asserted during the entire period of RxON signal assertion if the data on RxD7–RxD0 is a HPNA 1.0 frame.

A MAC controller associated with the MAC layer can access and control the aforementioned signaling interface through a list of 16-bit memory mapped registers. Inside the register set, some registers are implemented in the MAC and some are implemented in the PHY layer. The registers accessible by the MAC 705 are listed in the table shown in FIG. 12.

Referring to FIG. 12, the Tx Address register (register 0) is used by the MAC 705 to specify the starting address of its frame buffer, which is used to store the frame to be transmitted to the PHY 710. Before the TxON signal is asserted by the MAC 705, the Tx Address register will contain a valid frame buffer start address. The content of this register does not change until updated by the MAC 705.

The Tx Length register (register 1) is used by the MAC 705 to specify the number of octets of the frame data stored in the frame buffer to be transferred to the PHY 710. Before TxON signal is asserted, the Tx Length register will contain the valid frame length to be transferred to the PHY 710. The content of this register will not change until updated by the MAC 705.

The Rx Address register (register 2) is used by the MAC 705 to specify the starting address of its receive frame buffer which stores the frame data to be transferred from the PHY 710. Before RxON signal is asserted, the Rx Address register will contain the valid receive frame buffer start address. The content of this register will not change until updated by the MAC 705.

The Rx Length register (register 3) is used by the MAC 705 to get the number of octets of frame data that have been transferred and stored in MAC's receive frame buffer. After the RxON signal is de-asserted, the Rx Length register will contain the final number of octets in the receive frame buffer that contains the valid frame data. The content of this register will not change until the next frame receiving process is finished.

The Control register (register 4) is used by the MAC 705 to control the signals going from the MAC 705 to the PHY 710. The assignment of bits in the Control register are listed in the table shown in FIG. 13.

The Status register (register 5) is used by the MAC 705 to receive the status information for signals sent from the PHY 710 to the MAC 705. The assignment of bits in the status register are listed in the table shown in FIG. 14.

The Interrupt Mask register (register 6) is used by both the MAC and other modules residing in a DSP to selectively enable the delivery of interrupts from the PHY layer. The enables in this register do not affect the recording of interrupt conditions in the Interrupt Status register. The interrupts are delivered when both the specific mask bit is set and the Global Interrupt Enable is set in the Control register. The assignment of bits in the Interrupt Mask register are listed in the table shown in FIG. 15.

The Interrupt Status register (register 7) contains the status of the PHY 710 interrupt sources. A bit set in this register indicates that an interrupt has been generated. The actual interrupt signal is not asserted to the MAC 705 unless the corresponding enable bit is set to "1" in the Interrupt Mask register and the Global Interrupt Enable bit is set in the Control Register. Reading this register will clear all the bits in the register. This register has the value "0" at PHY reset. The assignment of bits in the Interrupt Status register are listed in the table shown in FIG. 16.

The CRC 32 registers (register 8 and 9) are used to store the high and low 16 bits of CRC32 calculated by the PHY 710 for the frame received. The contents of these two registers are valid immediately after the transition of the RxON signal from asserted to de-asserted. The MAC 705 then compares the PHY-calculated CRC32 with the one in the received frame for error checking.

The CRC16 register (register 10) is used to store the CRC 16 calculated by the PHY 710 for a received HPNA 2.0 frame. The content of this register is valid immediately after the transition of RxON signal from asserted to de-asserted. The MAC 705 then compares the PHY-calculated CRC 16 with the one in the received frame for error checking.

Besides the signaling interface between MAC 705 and PHY 710, a general purpose PHY management interface is defined to control the PHY and gather status information from the PHY 710 not only by the MAC 705 but also by a host controller associated with the MAC 705 on which a PHY management entity may reside. Two general purpose PHY management registers (register 11 and register 12) are defined for this purpose. The main difference between the General Purpose PHY Management registers and the registers defined above is that both the DSP core and an external host controller can access these PHY management registers. The table shown in FIG. 17 defines the general purpose PHY management control register (register 11) and the table shown in FIG. 18 defines the PHY management status register (register 12).

The aforementioned signaling interface between the PHY 710 and MAC 705 is controllable through a list of 16-bit registers accessible by the PHY 710. The registers are listed in the table shown in FIG. 19. All the registers are implemented in the PHY 710. However, some of them are accessible by the MAC 705. Some of the registers defined in FIG. 19 are the same as in FIG. 12.

The TxFrame Length register (register 0) of FIG. 19 is the same register as register 1 of FIG. 12 and the RxFrame Length register (register 1) of FIG. 19 is the same register as register 3 of FIG. 12.

The signal control register (register 2) of FIG. 19 is used by the PHY 710 to control the signals going from the PHY 710 to the MAC 705. The assignment of bits in the Signal Control Register is listed in the table shown in FIG. 20.

The Signal status register (register 3) of FIG. 19 is the same register as register 5 of FIG. 12 and the CRC32 registers (register 4 and 5) of FIG. 19 are the same registers as register 8 and register 9 of FIG. 12. The PHY 710 calculates the CRC32 for the received frame and stores the results in these two registers.

The CRC 16 register (register 6) of FIG. 19 is the same register as register 10 of FIG. 12. The PHY calculates the CRC 16 for the received frame and stores the result in this register.

The PHY management registers (register 7 and 8) of FIG. 19 are the same registers as register 11 and 12 of FIG. 12.

Referring back to FIG. 6, the DSP core 610 can also be used to accomplish some of the programmable PHY layer digital signal processing functions. The DSP module 640 is used for this purpose. A logically separate interface, the DSP/PHY interface 660 is defined for the data communications between the DSP module 640 and the PHY 620. The data transmitted from the PHY 620 to the DSP module 640 can include HomePNA sample data acquired through an HomePNA Analog Front End (AFE). The data transmitted from the DSP module 640 to the PHY 620 can include desired PHY layer DSP processing results. Since the DSP/PHY interface 660 access is mutually exclusive with respect to the MAC/PHY interface 650 access, some of the interface hardware components, such as a DMA controller, interrupt line, etc., can be shared between the two interfaces.

Some embodiments of the DSP/PHY interface 660 include the following exemplary characteristics: up to an 8 MHz sample rate for sample data transfer from the PHY 620 to the DSP module 640; data transmissions from the DSP module 640 to the PHY 620 through a general purpose DSP memory mapped interface to the PHY registers or FIFO; independent 16-bit wide transmit data paths from the PHY 620 to the DSP 640; and a debug interface that can be accessed by both the DSP core 610 and a host controller associated with the MAC module 630.

Exemplary DSP/PHY interface signals used for sample data transfer from the PHY 620 to the DSP module 640 include: SampOn, SampEn, SampD15-SampD0. The SampON signal is used to transmit a block of sample data from the PHY 620 to the DSP module 640. The SampON signal is provided by the PHY 620 to indicate that the PHY 620 has valid sample data bits on SampD15-SampD0. SampON remains asserted continuously from the first word of a block of sample data through the final word of the block of sample data. Upon SampON assertion, the PHY 620 starts sending the SampEn signal which indicates that a valid sample word is present on SampD15-SampD0. The SampEn signal is sourced by the PHY 620 to signal the DSP module 640 that new sample data has been placed on SampD15-SampD0 signal lines. The average rate of the SampEn signal pulses is the transmission sample rate, which can be, for example, around 8 MHz. The SampD15-SampD0 signals transition synchronously with the SampEn signal pulses. SampD15-SampD0 are driven by the PHY 620. For each period of SampEn asserted, SampD15-SampD0 provides sixteen valid sample data bits from the PHY 620 to the DSP module 640.

The DSP/PHY interface can be accessed and controlled through a list of 16-bit memory mapped registers by the DSP module 640. Some of the registers are implemented in the DSP module 640 and some of them are implemented in the PHY 620. The DSP accessible registers are defined by the table shown in FIG. 21.

Referring to FIG. 21, using the Sample data address register (register 0), the DSP module 640 writes the start address of the buffer which stores the sample data coming from the PHY 620. This register is set before the sample data is transferred from the PHY 620. Using the sample data length register (register 1), the DSP module 640 writes the sample data length it expects.

After a block of sample has been transferred from the PHY 620 to the DSP module 640 memory, the Rx Sample Data Length Register (register 2) stores the actual amount of sample data, in a 16-bit word, that has been transferred from the PHY 620. This is a DSP read-only register.

The DSP data length register (register 3) is used to store the amount of data, in 16-bit words, for DSP processed results that will be transferred to the PHY 620. It is written before the DSP module 640 starts to write the actual data into the DSP Data Port Register (register 4).

The DSP data port register (register 4) is used by the DSP module 640 to write the PHY layer DSP processing results to the PHY 620. The number of data words in one burst write is stored in the DSP data length register 3.

The aforementioned DSP/PHY interface 660 (FIG. 6) can also be accessed and controlled through a list of 16-bit registers and FIFO accessible by the PHY 620. Some registers are implemented in the DSP module 640 and some of them are implemented in the PHY 620. The registers defined below are accessible by the PHY 620. Some of the registers are the same as listed in the table shown in FIG. 21. FIG. 22 shows the registers accessible for reading and/or writing by the PHY 620.

The Rx sample data length register (resister 0) and DSP data length register (register 1) of FIG. 22 are the same as register 2 and register 3, respectively, of FIG. 21.

The DSP data port register (register 2) is used by the PHY to read the DSP processing. The number of data words in one block write is stored in the DSP data length register (register 1).

Figure 23:
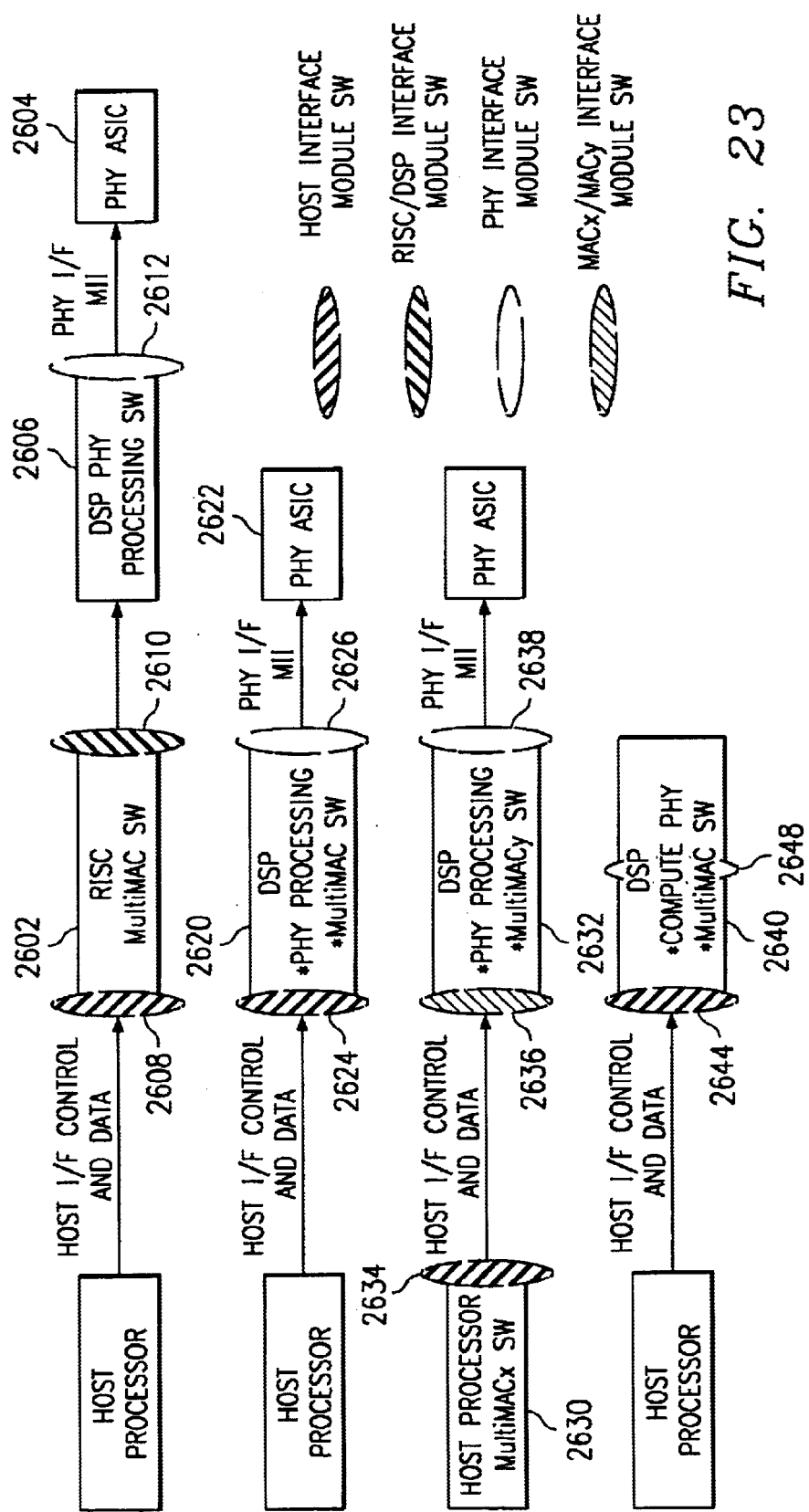
FIG. 23 illustrates exemplary MAC systems using a modulized soft MAC architecture.

Referring now to FIG. 23 there are shown four exemplary types of MAC architecture configurations implementing the modulized soft MAC in accordance with the present invention. In the first implementation the soft MAC is implemented in a single dedicated reduced instruction set controller (RISC) machine 2602 with the PHY layer implemented in both hardware 2604 and a digital signal processor (DSP) 2606.

The soft MAC modules are implemented within the RISC 2602 which also includes a host interface software module 2608 and a RISC/DSP interface software module 2610. Additionally, a PHY interface software module 2612 is implemented in the DSP 2606. Thus, the soft MAC modules and the programmable portions of the PHY layer are implemented in separate processors.

The second implementation illustrates that both the soft MAC modules and the programmable portions of the PHY layer are implemented in a single DSP 2620 where the remaining PHY portions are implemented in a hardware ASIC 2622. In this implementation, a host interface software module 2624 and a PHY interface software module 2626 are also implemented in the DSP 2620.

In the third implementation, MAC software modules, denoted MACx and MACy, have been split between the host processor 2630 and a DSP 2632. In this application, a host interface software module 2634 is implemented in the host processor 2630, and a MACx/MACy interface software module 2636 and PHY interface software module 2638 are implemented in the DSP 2632.

In the fourth implementation, all the MAC and PHY layer functions are implemented in a single DSP 2640 in which the host interface software module 2644 and the PHY interface software module 2648 are also implemented.

Another implementation of the present invention enables the co-existence of multiple standard define MACs in a single device for home network type application. One example is the 802.11 Wireless LAN when an associated Distribution System is composed of an Ethernet or HomePNA as its backbone and a portal/gateway device is used to connect the 802.11 LAN into the backbone. The portal device must contain multiple MACs (HomePNA with 802.11 or Ethernet with 802.11) to access multiple PHYs. In a multiple MAC device, a programmable MAC architecture allows multiple MACs to be easily implemented and integrated into a single device without having multiple MAC components which are each dedicated to only a single MAC type standard, thus, saving development time and cost.

Figure 24:
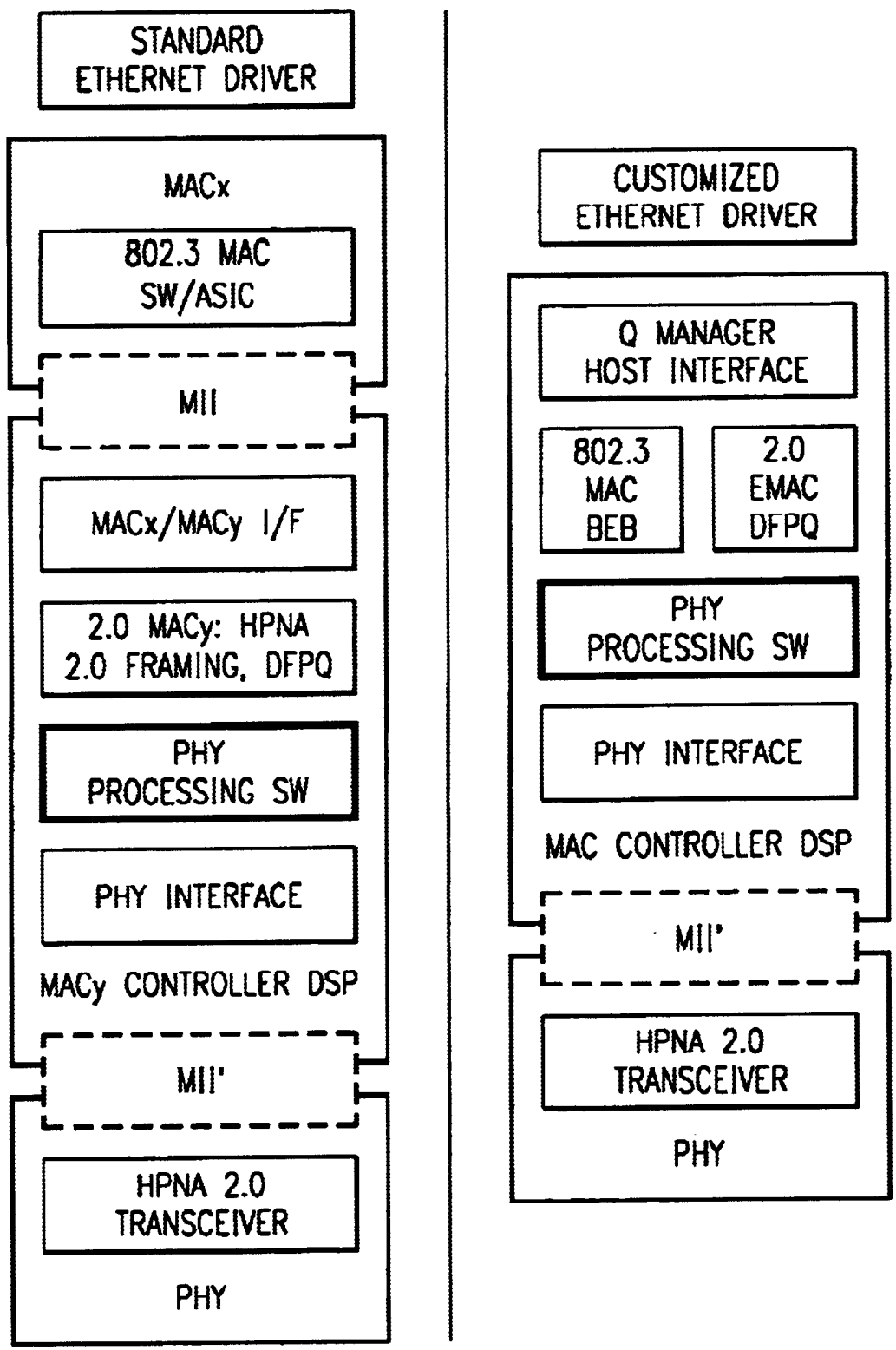
FIG. 24 illustrates exemplary implementations of HPNA 2.0 MAC architectures.

Another application example is the implementation of the HomePNA 2.0 MAC. As stated before, the HomePNA 2.0 has, two kinds of MAC architectures: the monolithic single MAC architecture and a two-layer MAC architecture that are inter-connected through the Media Independent Interface (MII) as illustrated in FIG. 24. In the first demonstrated architecture, it is possible that the application requires the HomePNA 1.0 MAC being implemented in a separate processor such as a host controller or even hardware versus the HomePNA 2.0 enhanced part of the MAC (EMAC) being implemented in a programmable MAC controller. Under this application, it is very critical that a programmable MAC architecture is designed to allow MAC functions distributable among multiple processors or split between hardware and software without major modifications of the architecture.

Although a preferred embodiment of the method and system of the present invention has been illustrated in the accompanied drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. An apparatus for implementing a media access control layer in an open system interconnection type network, comprising:

a plurality of operating modules each enabling a respective media access control layer operating function, wherein each of said plurality of operating modules is programmed to enable said operating module to perform its associated media access control layer operating function in accordance with a desired communications standard selected from among a plurality of communication standards;

a utility module programmed to enable at least one utility function employed by more than one of said plurality of operating modules for more than one of said of communication standards;

wherein said plurality of operating modules for each desire communication standard comprises a transmitter module, a receiver module, a deference algorithm module and a statistics maintenance module;

a host interface module configured to enable communication between a host processor and said media access control layer;

a physical layer interface module configured to enable communication between a physical layer and said media to access control layer; and an inter-module communication interface enabling communication between said plurality of operating modules.

2. The apparatus of claim 1, wherein:
said at least one utility function of said utility module includes error checking/calculation.

3. The apparatus of claim 1, wherein:
said at least one utility function of said utility module includes cyclic redundancy checking.

4. The apparatus of claim 1, wherein:
said at least one utility function of said utility module includes randomizing.

5. The apparatus of claim 1, wherein:
said at least one utility function of said utility module includes address filtering.

6. The apparatus of claim 1, further comprising:
a host processor producing interface control signals to said host interface module and serving as a data source for transmitted data and a data sink for received data;
a reduced instruction set controller executing said host interface module for communicating with said host processor, said reduced instruction set controller executing said desired plurality of operating modules and said utility module;
said inter-module communication interface includes a reduced instruction set controller/digital signal processor interface module executing via said reduced instruction set controller;
a digital signal processor connected to said reduced instruction set controller/digital signal processor interface module and executing said physical layer interface module.

7. The apparatus of claim 1, further comprising:
a host processor producing interface control signals to said host interface module and serving as a data source for transmitted data and a data sink for received data;
a digital signal processor executing said host interface module for communicating with said host processor, said digital signal processor executing said desired plurality of operating modules, said utility module and said physical layer interface module.

8. The apparatus of claim 1, further comprising:
a host processor producing interface control signals to said host interface module and serving as a data source for transmitted data and a data sink for received data, said host processor executing a first subset of said desired plurality of operating modules and said utility module;
a digital signal processor connected to said host interface module for communicating with said host processor, said digital signal processor executing a second subset of said desired plurality of operating modules and said utility module, said second subset including all of said desired plurality of operating modules and said utility module other than said first subset and executing said physical layer interface module.

9. The apparatus of claim 1, further comprising:
a host processor producing interface control signals to said host interface module and serving as a data source for transmitted data and a data sink for received data;
a digital signal processor executing said host interface module for communicating with said host processor, said digital signal processor executing said desired plurality of operating modules, said utility module and said physical layer interface module.

10. The apparatus of claim 1, wherein:
said transmitter module enables preprocessing of a packet transmission to the physical layer interface module including packet framing and transmit condition checking based on an output of said deference algorithm module.

11. The apparatus of claim 1, wherein:
said receiver module enables preprocessing of a packet received from the physical layer interface module including packet recognition, packet format checking, error checking and statistical information report to said statistics maintenance module.

12. The apparatus of claim 1, wherein:
said deference algorithm module implements a backoff algorithm when said media is busy and said transmitter module must delay current packet transmission.

13. The apparatus of claim 1, wherein:
said statistical maintenance module stores statistical data for the media access control layer including at least one of a number of packets transmitted/received, a number of bytes transmitted/received, a number of packets received with errors and a number of packets transmitted with deferring.

14. A method for implementing a media access control layer in an open system interconnection type network, comprising:

separating media access control layer operating functions into plurality of corresponding software-programmable operating modules;

programming each of said operating modules to perform its corresponding media access control layer operating function in accordance with a selected one of a plurality of communication standards; and programming a utility module programmed to enable at least one utility function employed by more than one of said plurality of operating modules for more than one of said plurality of communication standards wherein said plurality of operating modules for each desired communication standard comprises a transmitter module, a receiver module, a deference algorithm module and a statistics maintenance module.

15. The method of claim 14, wherein:
said at least one utility function of said utility module includes error checking/calculation.

16. The method of claim 14, wherein:
said at least one utility function of said utility module includes cyclic redundancy checking.

17. The method of claim 14, wherein:
said at least one utility function of said utility module includes randomizing.

18. The method of claim 14, wherein:
said at least one utility function of said utility module includes address filtering.

19. The method of claim 14, wherein:
said transmitter module enables preprocessing of a packet transmission to the physical layer interface module including packet framing and transmit condition checking based on an output of said deference algorithm module.

20. The method of claim 14, wherein:
said receiver module enables preprocessing of the packet received from the physical layer interface module including packet recognition, packet format checking, error checking and statistical information report to said statistics maintenance module.

21. The method of claim 14, wherein:
said deference algorithm module implements a backoff algorithm when said media is busy and said transmitter module must delay current packet transmission.

22. The method of claim 14, wherein:
said statistical maintenance module stores statistical data for the media access control layer including at least one of a number of packets transmitted/received, a number of bytes transmitted/received, a number of packets received with errors and a number of packets transmitted with deferring.

23. The method of claim 14, further comprising:
executing a host interface module for communicating with said host processor and said selected plurality of operating modules and said utility module on a reduced instruction set controller.

24. The method of claim 14, further comprising:
executing a host interface module for communicating with said host processor, said desired plurality of operating modules, said utility module and said physical layer interface module on a digital signal processor.

25. The method of claim 14, further comprising:
executing a first subset of said desired plurality of operating modules and said utility module on a host processor;

executing a second subset of said desired plurality of operating modules and said utility module, said second subset including all of said desired plurality of operating modules and said utility module other than said first subset a digital signal processor.

26. The method of claim 14, further comprising:
executing said desired plurality of operating modules, said utility module and a physical layer interface module on a digital signal processor.

* * * * *